United States Patent [19]
Bennett et al.

[11] Patent Number: 6,072,932
[45] Date of Patent: Jun. 6, 2000

[54] METHOD AND APPARATUS FOR CONNECTORIZING FIBER OPTIC CABLE

[75] Inventors: Alan Wayne Bennett, Hickory; Michael J. Ott, Taylorsville, both of N.C.

[73] Assignee: Siecor Corporation, Hickory, N.C.

[21] Appl. No.: 09/337,112

[22] Filed: Jun. 21, 1999

Related U.S. Application Data

[62] Division of application No. 08/885,983, Jun. 30, 1997, Pat. No. 5,915,055.

[51] Int. Cl.$^7$ .............................. G02B 6/00; G02B 6/36; G02B 6/38
[52] U.S. Cl. .............................................. 385/139; 385/59
[58] Field of Search .................... 385/53–59, 60, 385/65, 66, 70, 88–93, 139, 135, 100, 147

[56] References Cited

U.S. PATENT DOCUMENTS

| | | | |
|---|---|---|---|
| 4,556,282 | 12/1985 | Delebecque | 385/69 |
| 4,673,246 | 6/1987 | Schembri | 385/134 |
| 4,717,231 | 1/1988 | Dewez et al. | 385/135 |
| 5,100,221 | 3/1992 | Carney et al. | 385/135 |
| 5,142,606 | 8/1992 | Carney | 385/134 |
| 5,402,515 | 3/1995 | Vidacovich | 385/135 |
| 5,513,293 | 4/1996 | Holland et al. | 385/134 |

*Primary Examiner*—Akm E. Ullah

[57] ABSTRACT

A method for connectorizing fiber optic cables includes arranging a plurality of connectorized optical fiber jumpers having first and second opposed ends, such that the first end of each jumper is in parallel alignment with respect to the first end of each other jumper. Each of the second ends of the jumpers have a fiber optic connector disposed thereon. The first ends of the jumpers are then spliced onto a corresponding plurality of first ends of optical fibers of a fiber optic cable. Each of the first ends of the optical fibers of the fiber optic cable are also arranged in parallel alignment with respect to each other optical fiber so that the first ends of the optical fiber jumpers are axially aligned in an end-to-end relationship with the corresponding first ends of the optical fibers of the fiber optic cable. A jumper insert which has a tapered channel and a jumper seat which has a plurality of lengthwise extending bores which are provided to assist in arranging the jumpers in parallel alignment. A cable insert having a body defining a tapered channel is provided to assist in arranging the optical fibers in parallel alignment.

7 Claims, 4 Drawing Sheets

METHOD AND APPARATUS FOR CONNECTORIZING FIBER OPTIC CABLE

This application is a divisional application of Ser. No. 08/885,983, now U.S. Pat. No. 5,915,055.

FIELD OF THE INVENTION

The present invention generally relates to a method and apparatus for connectorizing fiber optic cable and, more particularly, a method, apparatus, and tools for connectorizing high count fiber optic cable using pre-connectorized optical fiber jumpers.

BACKGROUND OF THE INVENTION

Optical fibers are widely used in a variety of applications, including the telecommunications industry in which optical fibers are employed in a number of different applications. The optical fibers are carried in fiber optic cables which range from one to as many as 216 optical fibers. Normally, the fiber optic cable contains groups of 12 optical fibers in buffer tubes, either loose or in ribbon form. If a cable is to be joined to another cable or hardware in the field by connectors, it is common to attach the connectors to the cable at the factory before the cable is shipped to the installation site. This process is called "connectorization."

Fiber optic cable connectorization is typically a very labor intensive process because the fiber optic connector is usually attached to each optical fiber in the fiber optic cable manually, one at a time. The size and bulk of the cable may dictate that the connectorization occur at one location to miniimize the need to move the large cable around. The manual process involves furcating the optical fibers which are usually housed in buffer tubes inside of the fiber optic cable using a buffer tube fanout insert assembly of many that are known in the art. For example, U.S. Pat. No. 5,231,688 discloses a furcation kit that furcates the individual fibers from a cable for connectorization. After the furcation, a connector is installed that requires precise techniques to insure quality.

A need exists for a method and apparatus that improves the connectorization process of large fiber count cable.

SUMMARY OF THE INVENTION

It is an object of the present invention to provide a more efficient method for connectorizing fiber optic cables and specifically, high count fiber optic cables.

Still another object of the present invention is to provide tools and an assembly for use with the method for connectorizing fiber optic cables which allows shorter lengths of optical fibers to be ribbonized.

The present invention involves using preconnectorized single fiber jumpers that have been connectorized more efficiently because of the jumpers relatively small size and weight. If such jumpers are connectorized at both ends, then the jumpers can be cut at a midpoint to create twice as many jumpers with free ends that can be mass fusion spliced to the fiber of the cable.

These and other objects are provided, according to the present invention, by a method for connectorizing fiber optic cables which comprises arranging a plurality of optical fibers of the fiber optic cable so that a first end of each of the optical fibers is in parallel alignment and co-planar with respect to the first end of each other optical fiber. The first ends of the plurality of optical fibers of the fiber optic cable are spliced onto a corresponding plurality of first ends of optical fiber jumpers, the first end of each of said jumpers being in parallel alignment and co-planar with respect to the first end of each other jumper so that the first ends of the jumpers are axially aligned in an end-to-end relationship with the first ends of the optical fibers of the fiber optic cable. The jumpers have fiber optic connectors disposed upon respective second ends thereof.

An assembly for connectorizing fiber optic cables with a plurality of single fiber jumpers is provided that comprises a jumper insert having a lengthwise extending body with first and second opposed ends. The body defines a tapered channel which decreases in cross-sectional size from the first end to the second end through which the first ends of a plurality of optical fiber jumpers extend. The second end of the jumper insert defines a slot having a predetermined size for maintaining the first ends of the jumpers in side-by-side parallel and co-planar alignment. The assembly also comprises a cable insert having a lengthwise extending body with first and second opposed ends. The body defines a tapered channel which decreases in cross-sectional size from the first end to the second end through which the first ends of a plurality of optical fiber jumpers extend. The second end of the cable insert defines a slot having a predetermined size for maintaining the first ends of the cable fibers in side-by-side parallel and co-planar alignment.

DETAILED DESCRIPTION OF THE PREFERRED EMBODIMENTS

Figure 1:
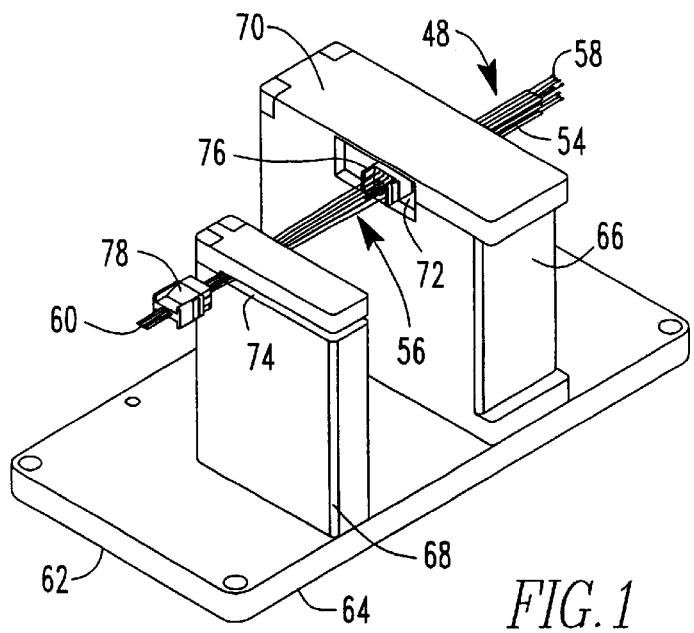
FIG. 1 is a perspective view illustrating the step of a preferred embodiment of the present invention of organizing the jumpers in the jumper insert and the jumper seat using a fiber organizing tool.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete. Like numbers refer to like elements throughout.

The method according to a preferred embodiment of the present invention comprises cutting a dual connectorized optical fiber jumper into two proximately equal parts thereby creating two single connectorized optical fiber jumpers having a fiber optic connector disposed on one end and a cut end opposite the fiber optic connector. One or more of the optical fiber jumpers are then spliced onto one or more respective optical fibers of a fiber optic cable. The connectorized optical fiber jumpers are preferably spliced onto the optical fibers of the fiber optic cable by mass fusion splicing or other comparable technique. Mass fusion splicing is well-known in the art and can be performed using a Siecor Model M12 or a Sumitomo Model T62 mass fusion splicer.

The connectorized jumpers used in accordance with a preferred embodiment of the present invention generally have 900 micron coatings and are usually made in twelve standard colors used in the industry (blue, orange, green, brown, slate, white, red, black, yellow, violet, rose and aqua) using specially selected fiber with a cutoff wavelength less than or equal to 1240 nm and core/clad concentricity less than or equal to 0.3 microns to achieve low splice loss. However, the method of the present invention can be employed with other sizes and other types of optical fibers, if so desired. Because the jumpers, as opposed to fiber optic cable, generally consist of one relatively short optical fiber, the jumpers are more readily connectorized. As a result, high quality jumpers can be connectorized in high volumes at relatively low cost relative to connectorizing large fiber count cables. These pre-connectorized jumpers may then be cut into two pieces, preferably of equal length, so that each piece includes one connector end and one optical fiber end capable of being spliced onto an optical fiber of a fiber optic cable.

The sequence of steps according to a preferred embodiment of the present invention comprise (1) selecting a plurality of pre-connectorized fiber optic jumpers, (2) preparing the jumpers for splicing by cutting the jumpers into two proximately equal parts, stripping the jumper coating, arranging the jumpers in parallel alignment, and ribbonizing the jumpers; (3) preparing the cable for splicing by cutting the buffer tube, arranging the optical fibers extending beyond the buffer tube in parallel alignment, and ribbonizing the optical fibers; (4) splicing the jumpers onto the optical fibers of the fiber optic cable; and (5) enclosing the resulting splice in a protective housing.

Figure 2:
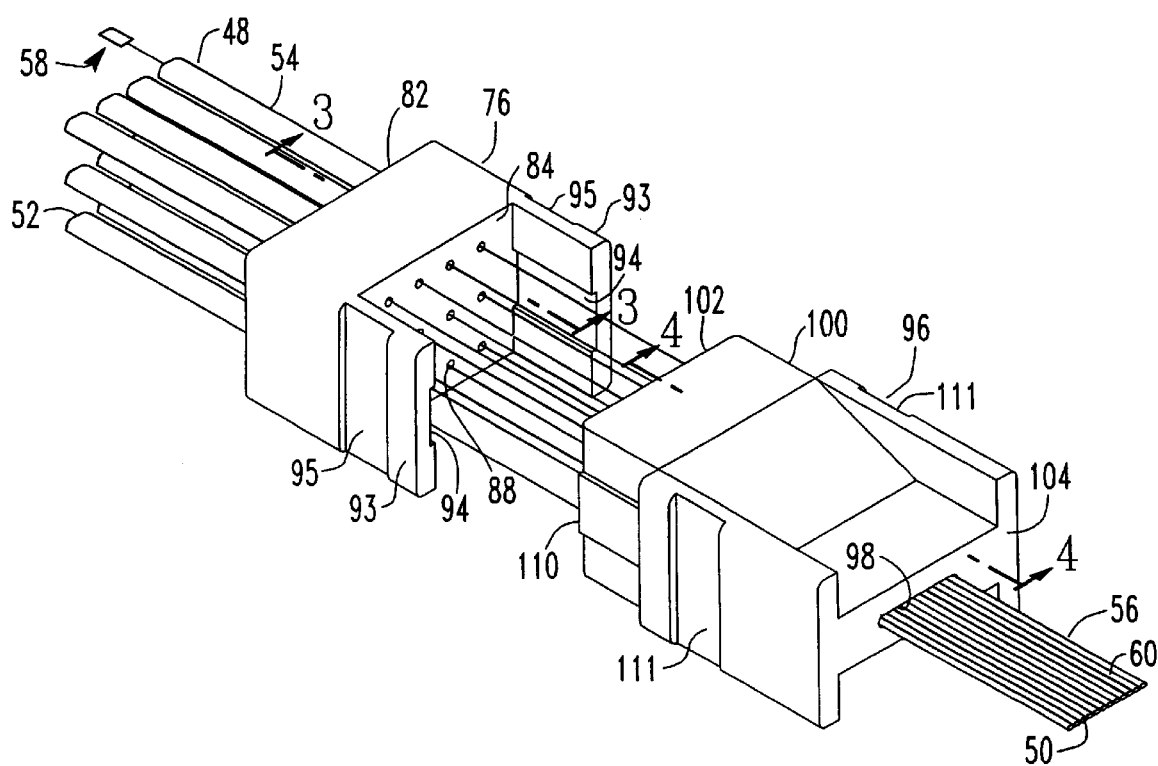
FIG. 2 is an exploded perspective view further illustrating the step of the embodiment of the present invention shown in FIG. 1 of organizing the jumpers.

FIGS. 1–5 illustrate the steps of preparing the jumpers 48 for splicing as well as illustrating the assembly and tools which may be used to accomplish the splicing. After cutting a plurality of dual connectorized jumpers into two parts and stripping about 4 inches of the 900 micron coating 54 from the non-connectorized (or cut) ends of the plurality of jumpers, preferably 12 jumpers each having a different color coating, the jumpers 48 are assembled together as shown in FIGS. 1–2. The stripped section 56 of each jumper opposite the fiber optic connector 58 is then prepared for splicing by arranging the plurality of jumpers so that the stripped section 56 of each jumper is in parallel and co-planar alignment with the stripped section of each other jumper, i.e., arranging the jumpers in a 12 fiber ribbon format or a 12×1 array 60. The fiber organizing tool 62 as shown in FIG. 1 may be used to arrange the jumpers 48 in parallel alignment. The fiber organizing tool includes a base 64 having two pedestals 66, 68. The first pedestal 66 includes a clamp 70, which is preferably padded and includes a magnet for holding the clamp in the closed position. The clamp forms a channel 72 when in the closed position. The clamp 70 is adapted to hold two molded parts, a jumper buffer seat 76 and a jumper insert 78 to facilitate arranging the jumpers 48 in ribbon format. Accordingly, the clamp 70 holds the jumper buffer seat 76 while the jumpers are organized into parallel alignment, i.e., a 12×1 array 60. The second pedestal 68 includes a slot 74 extending partially through the upper portion of the second pedestal which cooperates with the clamp 70 of the first pedestal 66 to organize the jumpers 48 in parallel alignment.

FIG. 2 shows more clearly the ends of the jumpers 48 which have been stripped of the 900 micron coating 54. The stripped section 56 of the jumpers are inserted into the jumper seat 76 which preferably arranges the jumpers in a 3×4 array. The jumper seat can define other types of arrays, however, without departing from the spirit and scope of the present invention. The jumpers are preferably arranged in a particular color order to correspond to the color order of the coatings on the optical fibers of the fiber optic cable. As shown more clearly in FIGS. 2–3, the jumper seat has first and second opposed ends 82, 84. The jumper seat 76 also includes a plurality of lengthwise extending bores 88 in spaced, parallel relationship with one another for receiving the optical fiber ends of the jumpers 48. That is, the jumper seat consists of an array of bores extending therethrough, preferably a 3×4 matrix of bores, in which the jumpers are seated.

Figure 3:
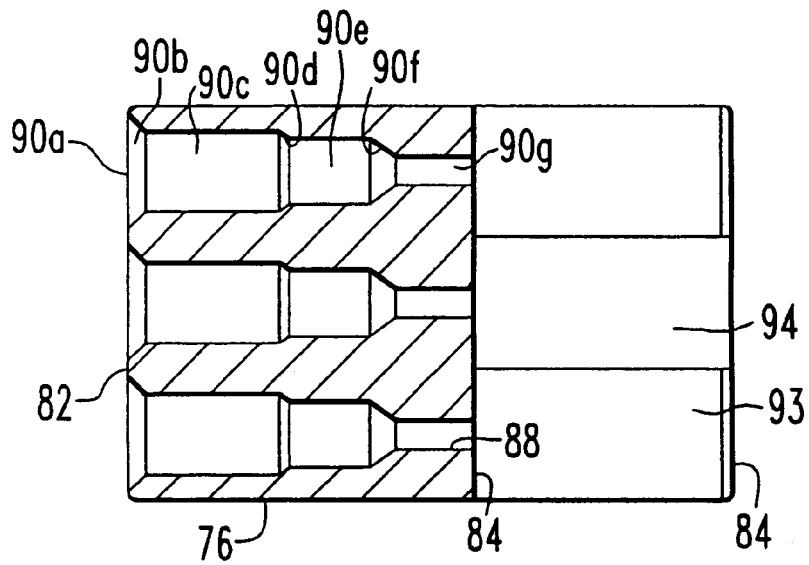
FIG. 3 is a cross-sectional side view along line 3—3 of FIG. 2.
Figure 4:
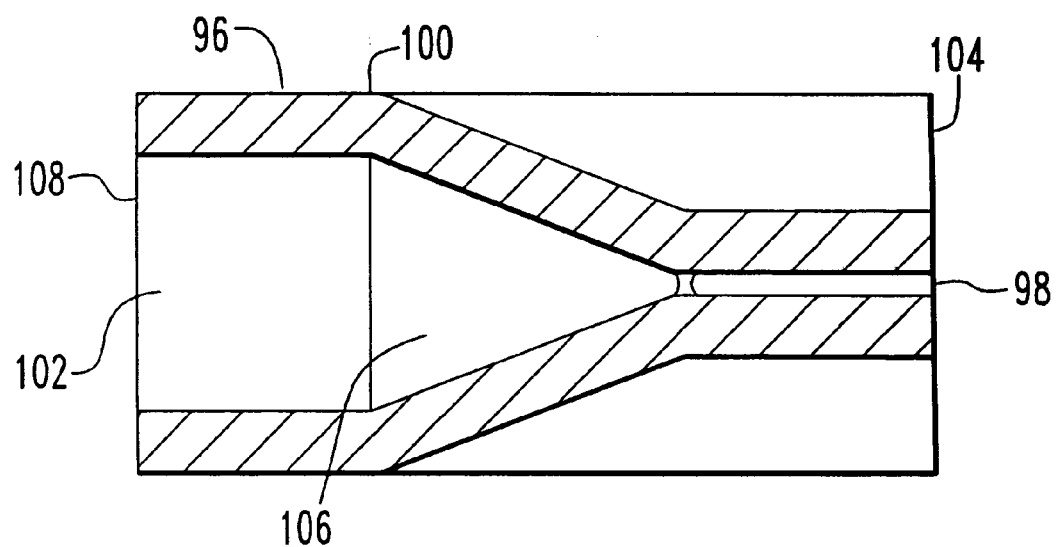
FIG. 4 is a cross-sectional side view along line 4—4 of FIG. 2.

Referring to FIG. 3, each of the bores 88 of the jumper seat preferably include an opening 90a through the first end 82 to facilitate insertion of the stripped end of the jumpers into the bores 88. From the first end 82 to the second end 84, the bores further include an opening 90a, a forward tapered section 90b, a forward cylindrical section 90c, small flats 90d which appear as a tapered section, a middle cylindrical section 90e, a rearward tapered section 90f, and a rearward cylindrical section 90g. The respective diameters of the tapered and cylindrical sections decrease in a direction from the first end 82 to the second end 84 such that the stripped end of the jumpers can be inserted through the opening 90a in the first end to a point at which the coating on the optical fiber contacts the small flats 90d. The small flats 90d in the bores 88 provide slight, temporary strain relief for the jumpers prior to permanent adhesion with epoxy. The second end 84 of the jumper seat has means, such as at least one lengthwise extending tab 93 for mating with the first end of the jumper insert 96. In a preferred embodiment, the tab includes a pair of arms extending outward from opposed sides of the second end of the jumper seat. The inner surface of each arm preferably defines a groove 94 adapted to receive a projection 110 on the first end 102 of the jumper insert. The outer surface of each arm of the tab also includes a groove 95, typically transverse to the groove defined by the inner surface of the arms, for mating with a projection or rib in a splice housing shown in FIG. 8.

Figure 8:
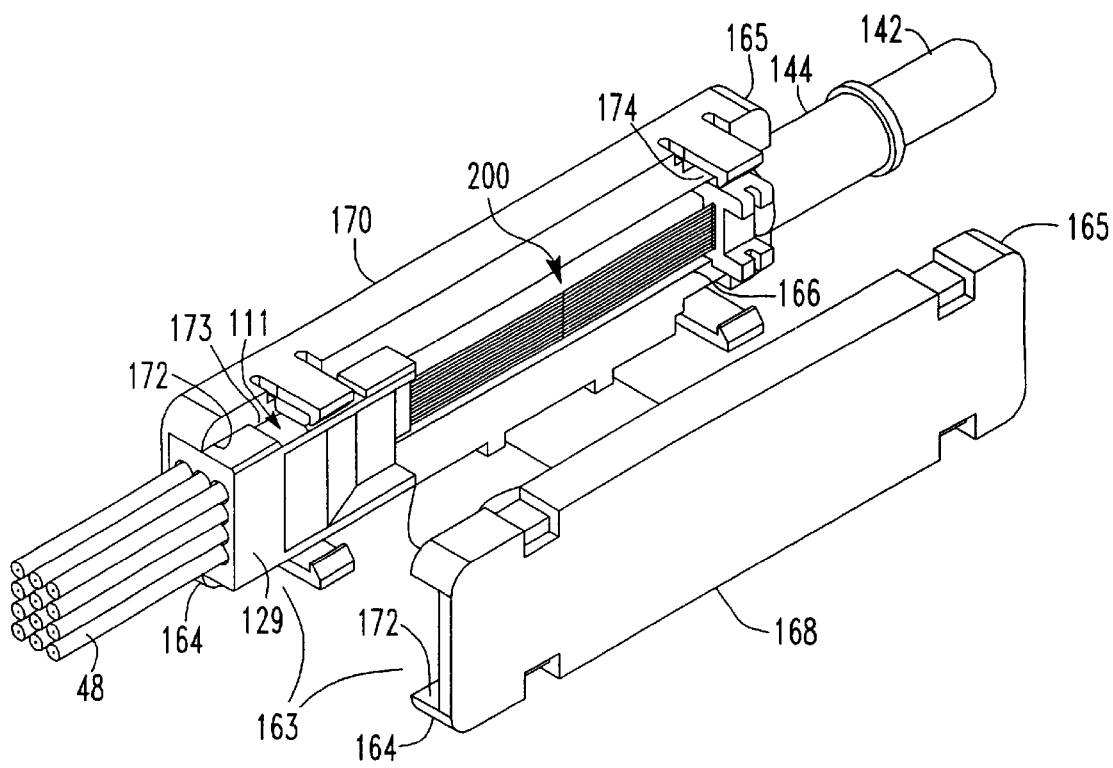
FIG. 8 is a perspective view illustrating the step of a preferred embodiment of the present invention of enclosing the optical fiber jumpers and the optical fibers of the fiber optic cable in a splice housing.

As is also shown in FIG. 2, a jumper insert 96, which includes a slot 98, is placed over the plurality of jumpers 48 in order to hold the stripped ends 56 of the jumpers in parallel and co-planar alignment. The jumper insert, shown in more detail in FIG. 4, has a lengthwise extending body 100 between first and second opposed ends 102, 104. The jumper insert body 100 defines a tapered channel 106 therethrough for receiving the plurality of optical fiber jumpers 48 as presented in the 3×4 configuration established by the jumper seat. The tapered channel 106 terminates into the slot 98 at the second end 104 of the jumper insert, which has a predetermined size for maintaining the jumpers in parallel and co-planar alignment. The first end 102 of the jumper insert includes an opening 108 for guiding the jumpers into the tapered channel 106. Thus, the tapered channel 106 of the jumper insert 96 facilitates arranging the fibers into a 12×1 array 60, and the slot helps to maintain the ribbon geometry. The slot 98 preferably has a tight tolerance with respect to the 12×1 array of fibers 60, although the jumper insert 96 and slot may be sized to accommodate any number of optical fibers. The first end 102 of the jumper insert is adapted to mate with the second end 84 of the jumper seat and with the tab 93 on the second end 84 of the jumper seat. The jumper insert is also adapted for mating with a splice housing 164 (FIG. 8). The outer surfaces of the opposed sides of the first end 102 of the jumper insert include a key 110 for engaging a respective groove 94 defined by the tab of the jumper seat. The outer surfaces of the opposed sides of the jumper insert also preferably include a vertically extending groove 95, typically transverse to the lengthwise extending projections, for mating with a projection or rib 173 in the splice housing 163 shown in FIG. 8.

Figure 5:
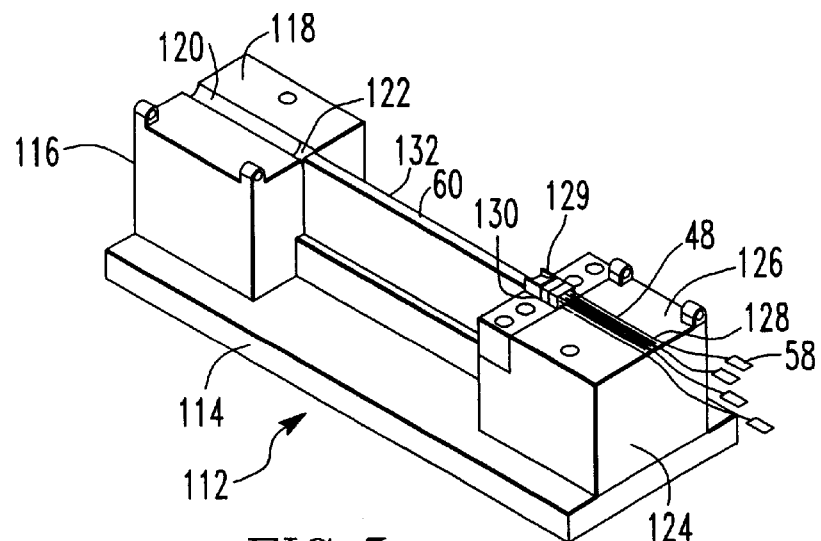
FIG. 5 is a perspective view illustrating the step of a preferred embodiment of the present invention of ribbonizing the optical fiber jumpers.

The jumper insert 96 is secured to the jumper seat 76 to form an assembly 129, preferably using a quick cure adhesive such as Loctite 411, and the jumper insert/seat assembly is placed in a fiber ribbonizing tool 112 as shown in FIG. 5. The ribbonizing tool is similar to the ribbonizing portion of the tool of U.S. Pat. No. 5,160,569. The ribbonizing tool includes a base 114 extending between a first end and a second end. A first platform 116 is secured on the base near the first end of the base. The first platform has a top surface 118 defining a groove 120 extending parallel to the base. The groove contains a cavity 122 adapted to receive a cable insert. The ribbonizing tool 112 also includes a second platform 124 secured on top of the base near the second end of the base. The second platform has a top surface 126 defining a channel 128 extending parallel to the base. The channel 128 has a recess 130 for receiving the jumpers insert 96 and a jumper seat 76. The ribbonizing tool also has a track 132 connecting the first and second platforms 116, 124 so that the groove 120, channel 128 and track 132 are in axial alignment with one another. The track 132 provides a ribbonizing slot in which the fibers can be placed in a predetermined color order to form the ribbon 60 while the jumper insert/seat assembly 129 is held in the recess 130 of the channel.

After the optical fibers are arranged in the predetermined color order in the ribbonizing slot 132, adhesive tape is applied to the 12×1 fiber array 60 and trimmed to size to temporarily hold the fibers together. The jumper insert/seat assembly 129 along with the optical fiber jumpers 48 are removed from the ribbonizing tool 112. Next, the coated fibers are glued to the jumper insert 96 preferably with Loctite 411 or comparable adhesive. A thin film of Loctite 411 is applied to the entire ribbon opposite the masking tape to hold the fibers together. Any tape remaining after the ribbonizing procedure is preferably removed from the ribbonized fibers.

After completing the preparation of the optical fiber jumpers as described above, the optical fibers 136 of the fiber optic cable are prepared for splicing with the jumpers. If the fiber optic cable 134 to be spliced to the jumpers includes one or more buffer tubes 142 containing loose optical fibers, then the optical fibers of the fiber optic cable are preferably arranged in a fiber ribbon format in a predetermined color order which corresponds to the ribbonized jumpers. If the fiber optic cable contains optical fibers in ribbon format, then the following steps of ribbonizing the optical fibers are not required and the optical fibers of the fiber optic cable are ready for splicing with the ribbonized optical fiber jumpers. Although the buffer tubes 142 generally contain 12 optical fibers, the method of the present invention may be used to connectorize fiber optic cable wherein the buffer tube contains any number of optical fibers.

Figure 6:
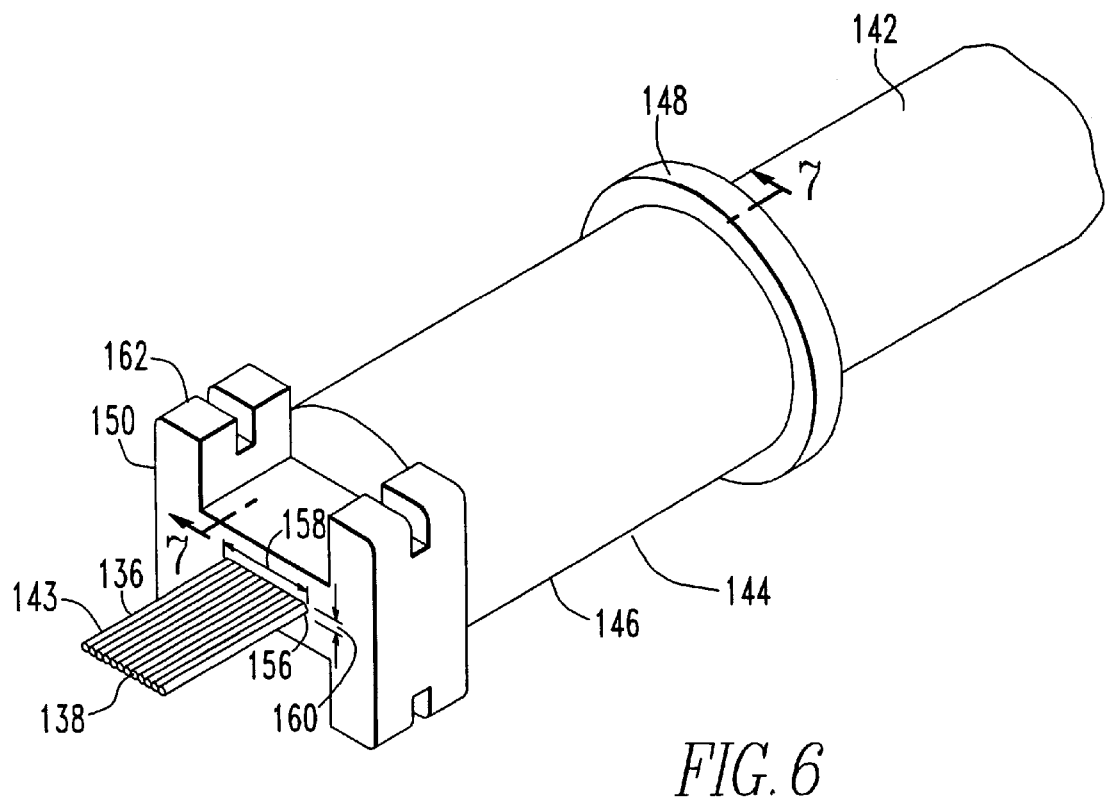
FIG. 6 is a perspective view further illustrating the step of a preferred embodiment of the step of organizing the optical fibers of the fiber optic cable in the cable insert.

Referring to FIG. 6, the loose tube cable is generally prepared for splicing with the 12×1 array of jumpers as follows. The buffer tube 142 is cut approximately 4 inches from the fiber end 138 and the filling compound (not shown) is cleaned from the fibers. The buffer tube is then loaded into the organizing tool 62 and the fibers 136 are arranged into a 12×1 array 143 in the standard color order. The magnetized clamp 70 on the fiber organizing tool can accommodate the buffer tube 142 as well as the jumper seat 76 as described above. As is also shown in FIG. 6, a cable insert 144 is placed on the 12×1 array 143 and secured to the buffer tube 142 preferably using heat cured epoxy and adhesive lined heat shrink tubing (not shown).

Figure 7:
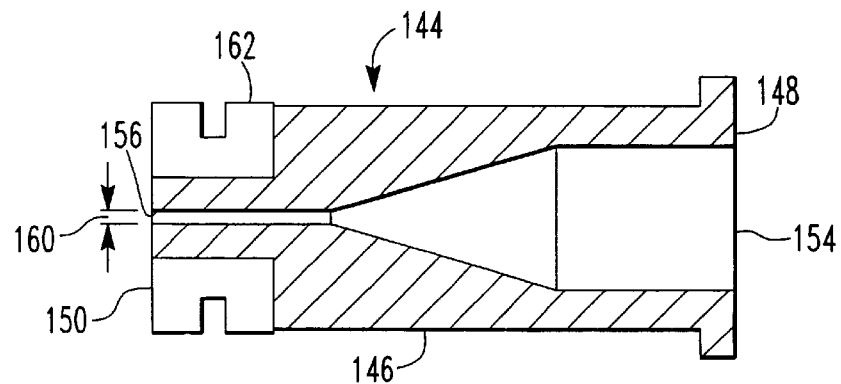
FIG. 7 is a cross-sectional side view along line 7—7 of FIG. 6.

The cable insert 144 provides a seat for the buffer tube 142 and an area in which the optical fibers transitions from the buffer tube to a 12×1 array 143 and preferably features a tight tolerance slot that maintains the ribbon geometry. Shown in more detail in FIG. 7, the cable insert 144 has a lengthwise extending body 146 between rearward and forward opposed ends 148, 150. The body 146 defines a tapered channel 152. At the rearward end of the cable insert 144, the tapered channel 152 defines an opening 154 adapted to receive a buffer tube 142 of a fiber optic cable while the tapered channel at the forward end 150 of the cable insert defines a slot 156 for maintaining the plurality of optical fibers of the fiber optic cable in parallel alignment. The slot preferably has a width 158 and a height 160 wherein the height is less than the width for maintaining the plurality of optical fibers in parallel alignment. The forward end 150 of the cable insert also preferably includes at least one member 162 for mating with a cavity 166 in a splice housing 164.

The cable insert 144 is placed on the cable side of the fiber ribbonizing tool 112 described above and shown in FIG. 5 and the optical fibers 136 (usually 12) are placed in the ribbonizing track 132. As described above, the surface 118 of the first platform includes a groove 120 adapted to receive the cable insert 144. Adhesive tape may be applied to the ribbon and trimmed to size to temporarily hold the fibers 136 together. The cable insert and the buffer tube are then removed from the ribbonizing tool. The optical fibers 136 are preferably glued to the cable insert with Loctite 411. A thin film of 411 or other suitable adhesive is applied to the entire ribbon or array of optical fibers 143 opposite the masking tape to hold the fibers together. Any tape remaining after the ribbonizing procedure is preferably removed from the ribbonized fibers.

Once the optical fibers 136 of the cable and optical fiber jumpers 48 have been prepared for splicing, such as by ribbonizing, the cable insert 144 and jumper seat/insert assembly 129 containing the respective ribbonized optical fibers 60, 143 may be loaded into chucks that are placed in a mass fusion splicing machine (not shown) and the ribbonized optical fiber jumpers 60 and the ribbonized optical fibers of the fiber optic cable 143 are spliced together simultaneously. The ribbonized jumpers and ribbonized optical fibers may be spliced together according to normal ribbon splicing procedures which are well-known in the art and generally provided with the mass fusion splicing machine.

After the optical fibers 136 of the fiber optic cable and the optical fiber jumpers 48 have been spliced together, the splice 200 is preferably enclosed in a splice housing 163, as shown in FIG. 8, which includes top and bottom halves 168, 170. Each half of the splice housing contains a recess 172, 174 for receiving the jumper buffer seat/insert assembly 129 and the cable insert 144, thereby providing strain relief. The splice 200 resides in the cavity 166 between the recesses 172, 174 which provides room, if desired, for filling compounds such as room temperature vulcanizing silicone rubber (RTV). Preferably, however, the splice is coated with a UV cureable coating instead of filling the recesses around the splice with RTV compounds. The external features of the splice housing 163 are the same as those of the current Siecor MBR fan out housing, making it 100% compatible with all current hardware. The internal features of the splice housing are, however, specially designed to receive and retain the jumper insert/seat assembly 129 and the cable insert 144. More specifically, the first recess 172 of the first ends 164 of each half of the splice housing is designed to mate with the jumper seat/insert assembly 129 while the second recess 174 at the second ends 165 of each half of the splice housing 163 is designed to mate with the cable insert. The first recess 172 includes ribs 173 for mating with the grooves 95, 111 defined by the outer surface of the jumper seat/insert assembly 129.

As described above the method of the present invention provides a low cost, fast, and efficient method for connectorizing fiber optic cable which provides consistent, high quality connectorized cables. In particular, optical fiber jumpers which have been more readily connectorized due their small size and weight may be organized and spliced to the optical fiber of fiber optic cable, especially those cables containing 72 or more optical fibers. The present invention provides an assembly including a jumper insert, a jumper seat, a cable insert, and a splice housing to facilitate connectorizing fiber optic cable using the method of the present invention.

In the drawings and specification there has been set forth a preferred method and apparatus of the invention and, although specific terms are employed, the terms are used in a generic and descriptive sense only and not for the purpose of limiting the scope of the invention being set forth in the following claims.

That which is claimed is:

1. A method of connectorizing a fiber optic cable comprising:

arranging a plurality of optical fibers of the fiber optic cable so that a first end of each of the optical fibers is in parallel alignment and co-planar with respect to the first end of each other optical fiber; and splicing the first ends of the plurality of optical fibers of the fiber optic cable onto a corresponding plurality of first ends of optical fiber jumpers, the first end of each of said jumpers being in parallel alignment and co-planar with respect to the first end of each other jumper so that the first ends of the jumpers are axially aligned in an end-to-end relationship with the first ends of the optical fibers of the fiber optic cable, said jumpers also having fiber optic connectors disposed upon respective second ends thereof.

2. A method according to claim 1 further comprising the step of creating the jumpers by cutting jumpers that are connectorized on both ends at a midpoint to create two single connector jumpers.

3. A method according to claim 1 further comprising the step of securing the optical fibers of the fiber optic cable together in the parallel and co-planar alignment following said arranging step.

4. A method according to claim 1 further comprising the step of securing the first ends of the optical fiber jumpers together in the parallel and coplanar alignment.

5. A method according to claim 1 wherein the step of arranging the plurality of optical fibers of the fiber optic cable comprises inserting the first ends of the plurality of optical fibers through a cable insert having a lengthwise extending body with first and second opposed ends, said first end of said cable insert adapted to receive a buffer tube of the fiber optic cable and a second end of said cable insert defining a slot for maintaining said plurality of fibers in said parallel alignment.

6. A method according to claim 5 further comprising the step of securing the buffer tube of the fiber optic cable to the cable insert.

7. A method according to claim 1 further comprising the step of enclosing the first ends of the optical fibers and the first ends of the optical fiber jumpers within a splice housing following said splicing step.

\* \* \* \* \*